United States Patent [19]
Muthusamy

[11] Patent Number: 5,961,581
[45] Date of Patent: Oct. 5, 1999

[54] METHOD AND CIRCUIT FOR DETECTING ADDRESS LIMIT VIOLATIONS IN A MICROPROCESSOR-BASED COMPUTER

[75] Inventor: Karthikeyan Muthusamy, Austin, Tex.

[73] Assignee: Advanced Micro Devices, Inc.

[21] Appl. No.: 08/671,381

[22] Filed: Jun. 27, 1996

[51] Int. Cl.$^6$ ........................................................ G06F 7/50
[52] U.S. Cl. .......................................... 708/670; 711/204
[58] Field of Search ............................ 364/768; 711/203, 711/204

[56] References Cited

U.S. PATENT DOCUMENTS

| | | | |
|---|---|---|---|
| 5,233,553 | 8/1993 | Shak et al. ................................ | 364/768 |
| 5,612,911 | 3/1997 | Timko ....................................... | 364/768 |

OTHER PUBLICATIONS

Hennessy et al., *Computer Architecture, a Quantitative Approach*, Morgan Kaufmann 1990, pp. A–32–A–36.

*Primary Examiner*—David H. Malzahn
*Attorney, Agent, or Firm*—Kevin L. Daffer; Conley, Rose & Tayon

[57] ABSTRACT

An address limit violation detection circuit in a microprocessor-based computer system for eliminating delay between the generation of a definite limit violation (DLV) signal and the generation of a potential limit violation signal. The detection circuit includes a full adder circuit which is adapted to receive a linear address, a base address, and a limit value and further adapted to produce a plurality of sum bits and a plurality of carry bits in response thereto. The circuit further includes a DLV detection circuit adapted to receive the plurality of sum bits and carry bits from the full adder circuit and further adapted to produce a DLV signal in response thereto. The DLV signal is indicative of whether the linear address is greater than the sum of the base address and the limit value. The invention further includes a PLV detection circuit adapted to receive the plurality of sum bits and carry bits from the full adder circuit and further adapted to produce a PLV signal in response thereto wherein the PLV signal indicates whether the linear address is equal to the sum of the base address and the limit value. In a presently preferred embodiment, the PLV detection circuit includes n–1 EXOR gates where each of the n–1 EXOR gates receives one bit of the plurality of sum bits and a corresponding bit of the plurality of carry bits as inputs. Each of the n–1 EXOR gates produces an output which comprises one bit of n-bit result.

26 Claims, 4 Drawing Sheets

| | | |
|---|---|---|
| Linear Address | 57h | 01010111 |
| Base Address | 3Dh | 00111101 |
| Logical Limit | 1Ah | 00011010 |

160

```
                           876543210  i
                      =    01010111  aᵢ
1's Complement     =       11000010  bᵢ       — 162a
1's Complement     =       11100101  cᵢ       — 162b
              sumᵢ =       01110000           — 164
            carryᵢ =       11000111           — 166
      inverted sum₀ =              1          — 168
       sum1 ⊕ carryᵢ =       1111111          — 170
           resultᵢ =        11111111          — 172
```

$sum_i = a_i \bar{b_i} \bar{c_i} + \bar{a_i} b_i \bar{c_i} + \bar{a_i} \bar{b_i} c_i + a_i b_i c_i$ $carry_{i+1} = a_i b_i \bar{c_i} + a_i \bar{b_i} c_i + \bar{a_i} b_i c_i + a_i b_i c_i$

FIG. 4

METHOD AND CIRCUIT FOR DETECTING ADDRESS LIMIT VIOLATIONS IN A MICROPROCESSOR-BASED COMPUTER

BACKGROUND OF THE INVENTION

1. Field of the Invention

This invention relates to the field of microprocessor-based computers and more particularly to a method and circuit for detecting potential limit violations (PLVs), the method and circuit resulting in faster detection of PLVs by generating a PLV signal in parallel with the generation of a definite limit violation (DLV) signal.

2. Description of the Relevant Art

In many microprocessor-based computing systems, including the popular X86 based microprocessors, more than one type of memory address is used. For example, X86 processors use three different memory address formats: physical addresses, linear addresses, and virtual addresses. Application software programs written for X86 based systems generally use virtual addresses to reference memory locations. Virtual addresses (also known as logical addresses) are addresses containing two parts—a base address and an offset from the base address. This two part address must be translated or mapped into a physical memory address by an address translator.

Virtual addresses are useful because they enable the concept of virtual memory. Virtual memory refers to the ability of the software to reference more memory locations than are present in the system's physical memory. In a 32-bit based system, for example, the physical memory address space is equal to $2^{32}$ or 4 gigabytes. This is the maximum amount of system memory that can be accessed by the microprocessor. In contrast, the virtual memory address space in a 386/486 type system is much larger. In such a system, the base address (also known as the selector) is a 14-bit number while the offset is a 32-bit number. The virtual address space, therefore, is 64 Terabytes ($2^{46}$).

Programming with virtual memory addresses is beneficial because the programmer is not constrained by the amount of physical memory on the user's system. When the computing system translates the virtual address into a linear or physical address, a check is performed to determine if the translated address is currently residing in the physical memory of the system. If the computing system determines that the translated address is not currently residing in the physical memory, the system retrieves the information associated with the translated address from a storage device, typically a hard disk and stores the information into the system memory. Using this translation method, software programs can be written without regard to the amount of physical memory residing on the system that is executing the program. In addition, the use of virtual memory and address translation facilitates the protection of specified physical memory addresses. Imagine, for example, a system in which the operating system software resides in the first two megabytes of system memory. In such a system, it is desirable to restrict application programs from accessing these first two megabytes of physical memory. This result can be achieved by insuring that no virtual addresses are mapped into physical addresses 0 through 2M ($2^{21}$).

The virtual address scheme further facilitates the protection of certain areas of physical memory by checking to insure that every address referenced by the processor is within certain permissible boundaries. These boundaries are generally defined as a maximum offset from a particular base value. Virtual memory systems divide the address space into segments. The definition of each memory segment includes a limit value which, together with the base address (the address associated with the first memory location within the segment) define the size of the segment and the range of permissible virtual addresses within that segment. Once the boundaries of a segment have been defined, virtual memory references to that segment may be easily checked to determine whether the referenced address is within the limits of the segment by simply comparing the offset of the referenced location to the limit value. For this reason, address limit checking is typically done using virtual representation of a memory address.

In microprocessor systems that utilize a cache memory array to enhance performance, limit checking becomes somewhat more complicated partly because linear addresses, rather than virtual addresses are commonly used to access the cache. In cached systems, not only must every memory reference be compared to a limit value, each memory reference must also be compared to an array of addresses stored in the cache to determine if the information associated with the referenced address is currently residing in the cache. A cache memory is a high speed memory unit interposed in the memory hierarchy of a computer system between a relatively slow system memory and a central processing unit to improve effective memory transfer rates and accordingly improve system performance. The name refers to the fact that the small cache memory unit is essentially hidden and appears transparent to the user, who is aware only of a larger system memory.

The cache is usually implemented by semiconductor memory devices, such as static RAMs, having speeds that are comparable to the speed of the processor while the system memory utilizes a less costly, lower speed devices, such as dynamic RAMs. The cache concept anticipates the likely reuse by the microprocessor of selected data in system memory by storing a copy of the selected data in the cache memory. A cache memory typically includes a plurality of memory sections, wherein each memory section stores a block or line of two or more words of data. For example, an 8 Kbyte cache could be arranged as 512 lines wherein each line contains 16 bytes of information. Each line has associated with it an address tag. When the processor initiates an access to system memory, a comparison is made between the memory address and the array of address tags to determine whether a copy of the requested information resides in the cache memory. This address comparison is commonly made using an address format other than virtual (i.e., linear or physical).

A problem exists in microprocessor-based computing systems utilizing cache memories because limit checking is typically accomplished by comparing virtual addresses while comparisons between a memory address and the tags of a cache memory array are typically done with linear or physical addresses. Because it is highly desirable to detect limit violations as early as possible, it would be desirable to effect a method for checking limit violations in which the limit detection is accomplished during the time when the processor is accessing the cache memory array.

Detecting limit violations typically includes the steps of comparing the offset of a virtual memory address with a limit value. If the offset is greater than the limit value, a limit violation has occurred and the processor is informed so that it may take appropriate action. When combined with the utilization of a cache memory array however, the limit checking process becomes more complex because of the address format distinction noted above and further because each cache memory tag typically includes only the most significant bits of a memory address. A line of cache memory, as noted above, may contain multiple consecutive memory locations. The cache array tags therefore, are generally required to contain only the most significant bits of the address field. For example, if the cache memory array is organized into 512 lines wherein each line contains 16 sequential bytes, then the tags need not contain the least significant four bits of the memory address. If a limit value falls intermediate to one of these 16 byte blocks, the processor will not be able to definitively determine whether a limit violation has occurred during the comparison with the cache array tags because the tags are less precise than the limit addresses (i.e., the tags do not utilize the least significant bits of the limit value). As a result, a comparison of a requested memory address and the tag field of a cache memory array can produce three limit violation outcomes.

The first outcome, known as a definite limit violation (DLV) occurs when the most significant address bits of the requested memory address exceed the corresponding most significant bits of the limit value. In this case, a limit violation has definitely occurred because the address of the referenced memory location will exceed the limit value regardless of the values of the least significant bits. The CPU should be signaled so that it can take appropriate action. A second outcome occurs when the most significant bits of a requested memory address are less than the most significant bits of a logical limit value. In this case, a limit violation has definitely not occurred for analogous reasons. The third situation, known as a potential limit violation (PLV), occurs when the most significant bits of the requested memory address are equal to the cache tag. When this condition occurs, it is not definitely known whether the requested memory address exceeds the limit value and the processor must be so informed so that it can perform additional operations to determine if a limit violation has occurred.

FIG. 1 is a block diagram of a conventional circuit for generating potential and definite limit violation signals in a system in which the linear address format is used when accessing the cache. Linear address 4 is an n-bit signal that represents the linear address of a memory location. Limit checking is accomplished by comparing the offset of the linear address against a limit value. Therefore, to determine whether a given linear address represents a potential or DLV, it is necessary to convert the linear address to its virtual address equivalent for direct comparison with the logical limit. To convert linear address 4 to its virtual address, the base address must be subtracted from the linear address. To accomplish this task, a base address signal 6 is provided. Subtracting base address 6 from linear address 4 yields the virtual address offset of linear address 4. This offset can then be directly compared against limit 8. Thus, the virtual limit 8 is provided to the circuit so that it may be subtracted from the offset address.

Typically, linear address 4, complemented base address 6, and complemented logical limit 8 are routed to a full adder circuit 12. Full adder circuit 12 includes n 3-to-2 adders for combining the three inputs. As is well known in the field of digital logic, a full adder circuit generates a sum bit and a carry bit that are dependent upon the inputs. Full adder circuit 12 comprises n full adders in parallel, and therefore produces as a result a sum signal 16 comprising n sum bits and an n bit carry signal 14.

Sum signal 16 and carry signal 14 are routed to carry lookahead adder 18. Carry lookahead adders are well known circuits for performing fast addition operations. A generalized carry lookahead adder is described in John L. Hennessy and David A Patterson, *Computer Architecture, a Quantitative Approach* (Morgan Kaufmann 1990) p.A-32 through A-36. Carry lookahead adder 18 includes a generate and propagate bits circuit 20, a carry bit circuit 26, and a sum bit circuit 32. Generate and propagate bits circuit 20 receives carry signal 14 and sum signal 16 and produces propagate signal 22 and generate signal 24. Propagate signal 22 is referred to as $p_i$ (n-1:0) and generate signal 24 is represented as $g_i$ (n-1:0) where $p_i$ is equal to (carry$_i$) OR (sum$_i$) and $g_i$ is equal to (carry$_i$) AND (sum$_i$). After generate and propagate bits circuit 20 has computed propagate signal 22 and generate signal 24, those signals are routed to carry bits circuit 26.

As its name implies, carry bits circuit 26 is responsible for producing carry signal 30 in response to receipt of propagate signal 22 and generate signal 24. Carry signal 30 is then routed to sum bits circuit 32 where it is combined with carry signal 14 and sum signal 16 to produce result 34. Result signal 34 is merely the digital representation of linear address 4—base address 6—logical limit 8. Carry bits circuit 26 produces, in addition to carry signal 30, carry out signal 27. Carry out signal 27 is indicative of whether the linear address is greater than the sum of base address 6 and logical limit 8. If carry out signal 27 indicates that linear address 4 is greater than the sum of base address 6 and logical limit 8, then a DLV has occurred. If, on the other hand, carry out signal 27 indicates that linear address 4 is not greater than (i.e., is less that or equal to) the sum of base address 6 and logical limit 8, then no DLV has occurred. Accordingly, it is seen that carry out signal 27 can be used as a DLV signal.

Because carry out signal 27 is generated prior to the generation of result signal 34, it is possible to know whether a DLV has occurred before one can know whether a PLV has occurred using the circuit shown in FIG. 1. Additional operations must be performed on carry signal 30, carry signal 14, and sum signal 16 before a PLV signal is available. In particular, carry signal 30, carry signal 14, and some signal 16, must be operated upon by sum bits circuit 32 to obtain result signal 34. Result signal 34 is then routed to a comparator 36 which determines if each bit within result signal 34 is equal to 0. If each bit within result signal 34 is equal to 0, comparator circuit 36 generates signal 38 which is indicative of whether each bit within result signal 34 is 0. If each bit within result signal 34 is 0, then linear address 4 is equal to the sum of base address 6 and logical limit 8 meaning that a PLV has occurred. If, on the other hand, one or more of the bits within result signal 34 is equal to 1, then linear address 4 is not equal to the sum of base address 6 and logical limit 8 and therefore, no PLV has occurred. It can be seen that output signal 38 of comparator circuit 36 is indicative of whether a PLV has occurred.

It will be appreciated to one skilled in the art that the circuit shown in FIG. 1 generates a DLV signal 27 prior to the time that the circuit generates PLV signal 38. Because the computer system requires both signals to fully determine whether a limit violation has occurred, the system must await the generation of PLV signal 38 before it can resume processing. The amount of time that elapses between the generation of DLV signal 27 and the generation of PLV signal 38 represent a limitation on system performance. It is therefore highly desirable to minimize or eliminate entirely the delay between the generation of DLV signal 27 and PLV 38.

SUMMARY OF THE INVENTION

The problems outlined above are in large part addressed by an improved method and circuit for generating PLV signals. The improved method and circuit utilize the signals produced by a full adder circuit to generate a PLV in parallel with the generation of DLV signal. Using the parallel circuitry, the improved method and circuit eliminate the delay between the generation of DLV signal and the PLV signal. By eliminating this delay, the improved method and circuit improve the performance of the system.

Broadly speaking, the present invention contemplates an address limit violation detection circuit in a microprocessor-based computer system. The detection circuit includes a full adder circuit which is adapted to receive a linear address, a base address, and a limit value. The full adder circuit is adapted to produce a plurality of sum bits and a plurality of carry bits in response to the linear address, the base address, and the limit value. The circuit further includes a DLV detection circuit. The DLV detection circuit is adapted to receive the plurality of sum bits and carry bits from the full adder circuit. The DLV detection circuit is further adapted to produce a DLV signal in response to the plurality of sum bits and carry bits. The DLV signal is indicative of whether the linear address is greater than the sum of the base address and the limit value. The address limit violation detection circuit further includes a PLV detection circuit. The PLV detection circuit is adapted to receive the plurality of sum bits and carry bits from the full adder circuit. The PLV detection circuit is further adapted to produce a PLV signal in response to the plurality of sum bits and carry bits wherein the PLV signal indicates whether the linear address is equal to the sum of the base address and the limit value. In a presently preferred embodiment, the full adder circuit includes an initial stage for producing a one's complement representation of the base address and the limit value. In one embodiment, the DLV detection circuit comprises the carry chain generation portion of a carry lookahead adder.

The present invention further contemplates a method of checking for address limit violations in a microprocessor-based computer. The method includes providing a linear address, a base address and a logical limit to a full adder circuit. The full adder circuit computes a plurality of sum bits and a plurality of carry bits in response to the linear address, the base address and the logical limit. A DLV detection circuit produces a DLV signal in response to the plurality of sum bits and the plurality of carry bits. A PLV circuit produces a PLV signal in response to the plurality of sum bits and the plurality of carry bits. In a presently preferred embodiment, the DLV signal indicates whether the linear address is greater than the sum of the base address and the logical limit while the PLV circuit indicates whether the linear address is equal to the sum of the base address and the logical limit. Preferably, the linear address, the base address and the logical limit each include n bits and the full adder circuit preferably includes n 3-to-2 adders in parallel wherein each adder receives one bit from the linear address, a corresponding bit from the base address and a corresponding bit from logical limit as inputs.

The present invention still further contemplates the address limit violation detection circuit described above wherein the PLV detection circuit includes n-1 EXOR gates where each of the n-1 EXOR gates receives one bit of the plurality of sum bits and a corresponding bit of the plurality of carry bits as inputs. Each of the n-1 EXOR gates produces an output which comprises one bit of n-bit result. Preferably, the PLV circuit further includes a circuit adapted to receive the n-bit result from the EXOR gates and further adapted to produce an output indicative of whether each of the n inputs comprises a logical one.

BRIEF DESCRIPTION OF THE DRAWINGS

Other objects and advantages of the invention will become apparent upon reading the following detailed description and upon reference to the accompanying drawings in which:

FIG. 4 is an illustrative example of the PLV circuit shown in FIG. 3.

Figure 1:
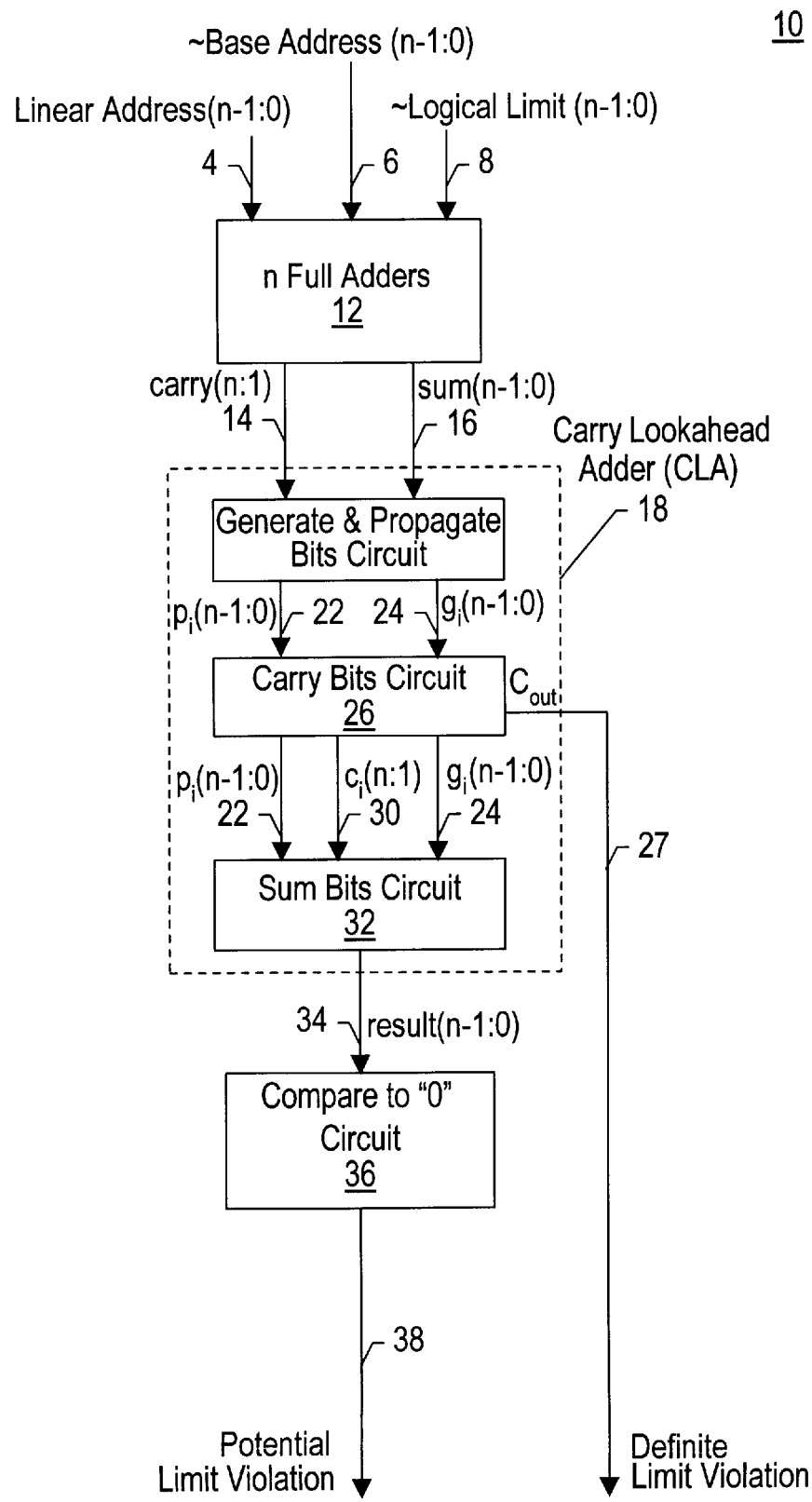
FIG. 1 is a partial block diagram of a limit violation signal generation circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE DRAWINGS

Figure 2:
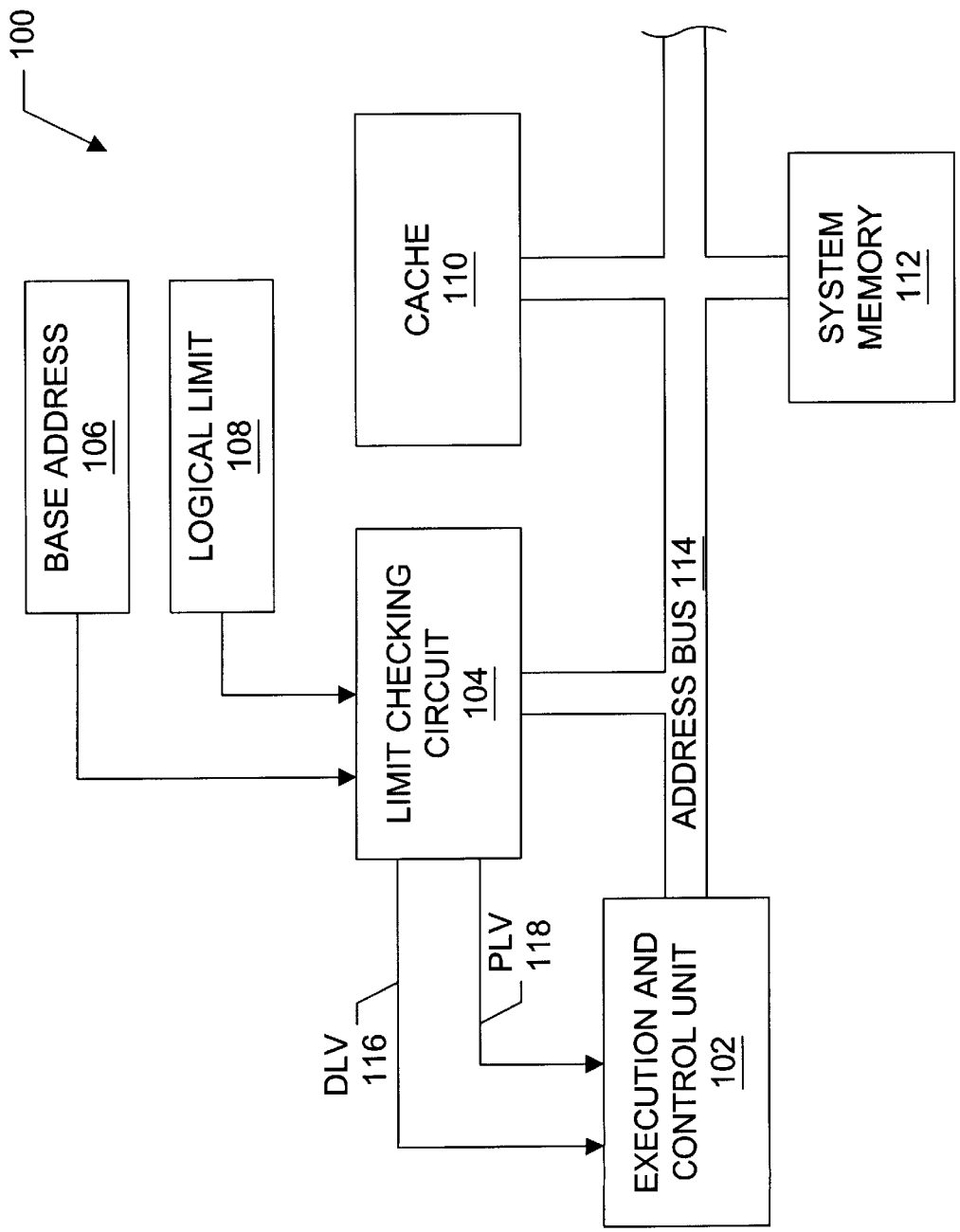
FIG. 2 is a partial block diagram of a microprocessor-based computing system.

Turning now to the drawings, FIG. 2 is a partial block diagram of a microprocessor-based computing system 100. System 100 includes execution and control unit 102 which interfaces to a limit checking circuit 104, a cache memory array 110, and system memory 112. A base address register 106 and a logical limit register 108 are supplied to the limit checking circuit 104 as inputs. In a presently preferred embodiment, limit checking circuit 104, base address register 106, and logical limit register 108 are integrated into microprocessor 101 (not shown in the drawing). Similarly, cache array 110 can be included within microprocessor 101 or, alternatively, a discrete cache array can reside external to microprocessor 101. Execution and control unit 102 generates instructions and data that reference memory addresses. These address references are routed to cache array 110 and system memory 112 over address bus 114. Microprocessor 101 includes a limit checking circuit 104 which is designed to alert execution and control unit 102 if it attempts to access an address location not within boundaries determined by a value stored in base address register 106 and logical limit register 108.

Cache array 110 typically comprises a plurality of lines wherein each line includes multiple sequential bytes of information. Thus, for example, a line of cache array 110 may include information from 16 consecutive memory addresses. Whenever a cache miss occurs, 16 bytes of information will be transferred from system memory 112 to cache array 110. The starting address of the 16 byte block is determined by truncating the four least significant bits of the memory address. For example, if execution unit 102 generates an access to memory location 00007AF3h that produces a cache miss, then 16 bytes of information beginning at address 00007AF0h will be transferred from system memory 112 to cache array 110. It can be seen from the preceding discussion that the least significant bits of a memory address are disregarded by cache array 110. It is therefore not generally necessary to provide the least significant bits of address bus 114 to cache array 110. In contrast, a limit value, which represents a boundary on accessible memory locations, may be located at any memory address and computing system 100 must consider all bits (including the least significant bits) of an address to determine if a limit violation has occurred. Because early detection of limit violations is desirable to improve system performance, it is not uncommon to check the most significant 28 address bits that are provided to cache array 110 for limit violations. When the least significant bits are unknown by the limit checking circuit 104, it is necessary to generate two types of limit violation signals. The first type, the DLV, occurs when the most significant 28 bits of the accessed memory address are greater than the most significant 28 bits of the address limit. A second violation signal, a PLV, is generated when the most significant 28 bits of the accessed memory address are equal to the most significant 28 bits of the limit value. A PLV is so named because it cannot be fully determined whether a limit violation has occurred by referring to only the most significant address bits. The PLV signal informs the microprocessor 101 that an additional limit violation check is necessary to determine whether a particular memory access is allowable. It is therefore necessary for limit checking circuit 104 to produce DLV signal 116 and PLV signal 118.

In addition to the problem created by the truncation of the least significant address bits, limit checking circuit 104 must be designed to account for the different addressing formats used by X86 type processors. In X86 processors, the address routed to cache array 110 is commonly formatted as a either a physical address or a linear address. The limit value, on the other hand is commonly expressed as a virtual (or logical) address. A logical address is a two-part address that includes a base address and an offset value. Prior to generating the appropriate limit violation signals, limit checking circuit 104 must ensure that it is comparing addresses of similar type. In computing systems that perform cache comparisons using the linear address format, linear address 125 is generated by execution unit 102 on address bus 114 is equivalent to the value stored in base address register 106 plus an offset value. If the offset value inherent in the linear address 125 is greater than the value stored in logical limit register 108, a limit violation has occurred. Accordingly, limit checking circuit 104 must subtract the base address stored in base address register 106 from linear address presented to limit checking circuit 104 by address bus 114 and to then compare the result of this subtraction with the logical limit stored in logical limit register 108. With these considerations in mind, an appropriate limit checking circuit 104 is shown in FIG. 3.

Figure 3:
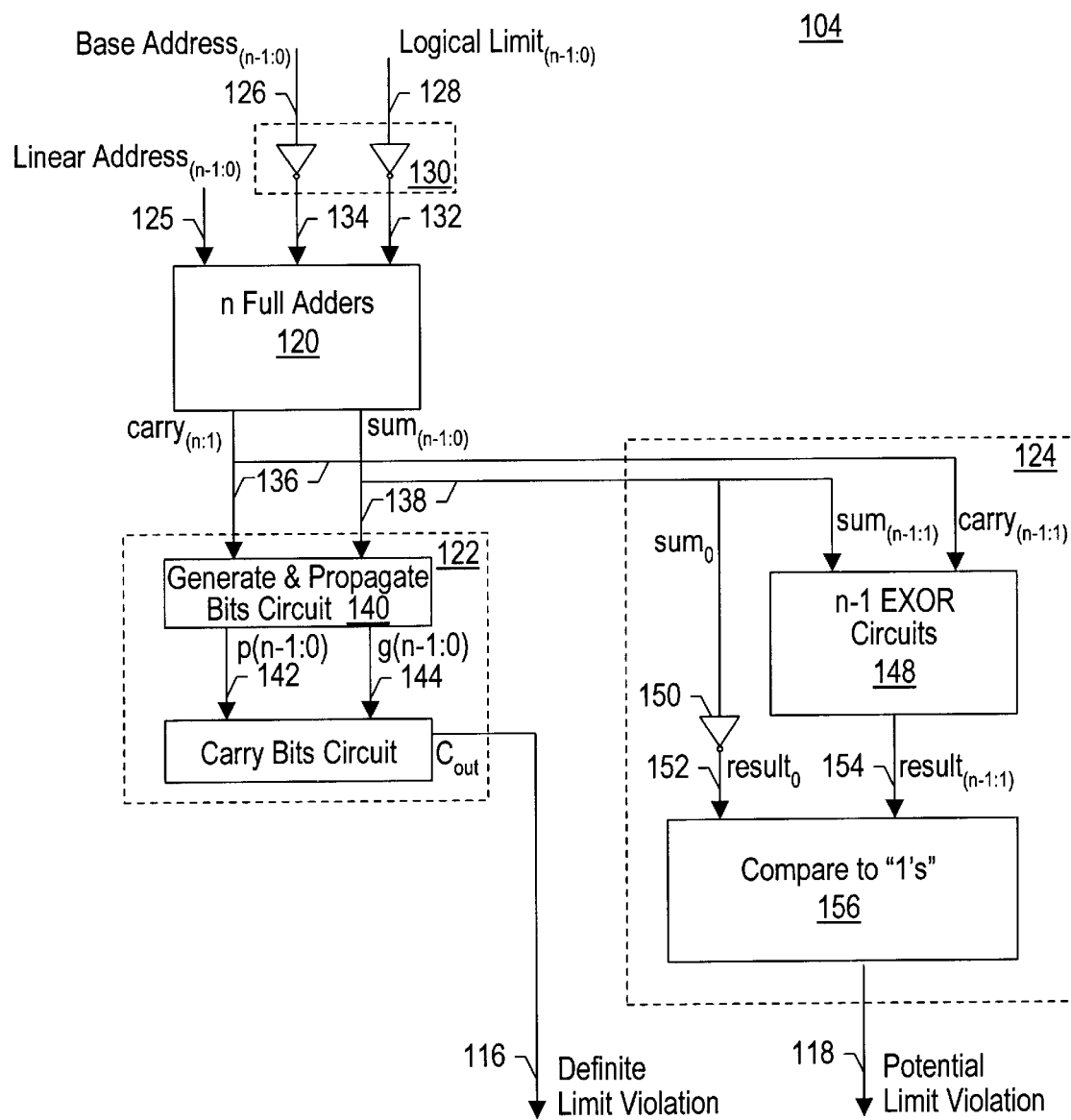
FIG. 3 is a partial block diagram of a limit violation signal generation circuit.

Turning now to FIG. 3, limit checking circuit 104 includes a full adder circuit 120, a DLV signal generation circuit 122, and a PLV circuit 124. Full adder circuit 120 receives linear address 125, base address 126, and logical limit 128 as inputs. Preferably, linear address 125, base address 126, and logical limit 128 each include n-bits. In a presently preferred embodiment, each bit within base address 126 and logical limit 128 is inverted with inverter circuit 130. Inverter circuit 130, therefore, produces a one's complement equivalent of base address 126 and logical limit 128, which are shown in the drawing as signal 134 and signal 132, respectively. Linear address 125, signal 134, and signal 132 form the inputs for full adder circuit 120. In a presently preferred embodiment, full adder circuit 120 includes n 3-to-2 adders in parallel. Each 3-to-2 adder within full adder circuit 120 receives one bit from linear address 125, a corresponding bit from signal 134, and a corresponding bit from signal 132 as inputs. Each 3-to-2 adder produces a carry bit and a sum bit in response to the three inputs. 3-to-2 full adder circuits are described in Hennessy and Patterson, *Computer Architecture A Quantitative Approach*, pp. A2–A3. Carry signal 136 is comprised of n-bits wherein each bit is computed from the three inputs according to the equation $c_{i+1}=a_i b_i + a_i c_i + b_i c_i$. From this equation, it can be seen that the carry bit 136 is equal to one whenever two or more of the inputs to the full adder circuit are 1. Sum signal 138 likewise contains n-bits wherein each bit is computed from the three inputs according to the equation $sum_i = \bar{a}_i \bar{b}_i c_i + \bar{a}_i b_i \bar{c}_i + a_i \bar{b}_i \bar{c}_i + a_i b_i c_i$. From this equation, $Sum_i$ is equal to 1 whenever an odd number of the inputs are equal to 1.

Carry signal 136 and sum signal 138 are routed in parallel to DLV circuit 122 and PLV circuit 124. Definite limit violation circuit 122 includes a generate and propagate bit circuit 140 and a carry bit circuit 146. Referring briefly back to FIG. 1, it can be seen that DLV circuit 122 includes the first two stages of the carry lookahead adder 18 shown in FIG. 1. Definite limit violation circuit 122 generates a DLV signal 116. Definite limit violation signal 116 is the carryout from carry-bit circuit 146.

Potential limit violation circuit 124 includes EXOR circuit 148, inverter 150, and comparator 156. Carry signal 136 and sum signal 138 provide the inputs to PLV circuit 124. The least significant bit of sum signal 138 (i.e., $sum_0$) is routed to inverter 150. The output of inverter 150, shown in the figure as $result_0$ 152 represents the least significant bits of a result signal. The remaining bits from carry signal 136 and sumsignal 138 are routed to EXOR circuit 148. EXOR circuit 148 includes n−1 EXOR gates in parallel. Each gate within EXOR circuit 148 receives one bit from sum signal 138 and a corresponding bit from carry signal 136 as inputs and produces in response thereto a result bit. The n−1 EXOR gates produce, therefore, n−1 output bits from EXOR circuit 148. These n−1 output bits from EXOR circuit 148 form result signal 154. Potential limit violation circuit 124 takes advantage of the fact that, if linear address signal 125 is equal to the sum of base address 126 and logical limit 128, then the output from EXOR circuit 148 will comprise all 1's. The $result_0$, signal 152 and each bit within result signal 154 are compared to logical 1 in comparator circuit 156. Comparator signal 156 generates a PLV signal 118 that is indicative of whether each bit within result signal 154 and $result_0$ 152 is equal to 1. If $result_0$ signal 152 and each bit within result signal 154 are equal to 1, then PLV signal 118 is set accordingly.

FIG. 4 is an illustrative example of the operation of PLV circuit 124. Imagine an 8-bit system in which a linear address 125 is equal to 57h, base address 126 is equal to 3Dh, and logical limit 128 is equal to 1Ah. It is noted that 3Dh+1Ah=57h and that, accordingly, this combination of inputs to circuit 104 should generate a PLV signal. FIG. 4 shows the binary equivalent of the three inputs to full adder circuit 120 in block 160 of FIG. 4. The 1's complement equivalent of base address 126 and logical limit 128 are shown as binary values 162a and 162b, respectively. Linear address 125, the 1's complement of base address 126, and the 1's complement of logical limit 128 are routed to full adder 120 to produce sum signal 138 and carry signal 136. Sum signal 138 is shown in binary representation as binary number 164 in FIG. 4. Carry signal 136 is shown as binary value 166. The least significant bit of sum signal 138 is inverted to form $result_0$ 152 and is shown in FIG. 4 as binary digit 168. EXOR circuit 148 exclusively OR's n−1 pairs of sum signal 138 and carry signal 136 to produce result signal 154 shown in FIG. 4 as binary value 170. $Result_0$ 152 and result 154 are combined to form the result signal which is routed to comparator circuit 156 and is shown in FIG. 4 as binary value 172. From inspection, it is seen that the result 172 is equivalent to all 1's when linear address 125 is equal to the sum of base address 126 and logical limit 128.

As will be appreciated by one skilled in the art having the benefit of this disclosure, limit violation detection circuit 154 is capable of producing a DLV signal 116 and a PLV signal 118 wherein the delay between generation of signal 116 and the generation of signal 118 is substantially reduced or entirely eliminated from the delay between the two signals generated in the circuit of FIG. 1. It is to be understood that the form of the invention shown and described is to be taken as exemplary, presently preferred embodiments. Obvious modifications and changes may be made without departing from the spirit and scope of the invention as set forth in the claims. It is intended that the following claims be interpreted to embrace all such modifications and changes.

What is claimed is:

1. In a microprocessor based computer system, an address limit violation detection circuit, comprising:
    a full adder circuit adapted to receive a linear address, a base address, and a limit value, and further adapted to produce a plurality of sum bits and carry bits in response thereto;
    a definite limit violation detection circuit adapted to receive said plurality of sum bits and carry bits from said full adder circuit and further adapted to produce a first signal in response thereto wherein said first signal is indicative of whether said linear address is greater than the sum of said base address and said limit; and
    a potential limit violation detection circuit adapted to receive said plurality of sum bits and carry bits from said full adder circuit and further adapted to produce a second signal in response thereto wherein said second signal is indicative of whether said linear address is equal to the sum of said base address and said limit value;
    wherein said potential limit violation detection circuit further includes a circuit adapted to receive n inputs and further adapted to produce an output indicative of whether each of said n inputs comprises a logical "1".

2. The circuit of claim 1 wherein said full adder circuit includes an initial stage for producing a one's complement representation of said base address and said limit value.

3. The circuit of claim 1 wherein said definite limit violation detection circuit includes a generate and propagate circuit, and a carry circuit coupled to said generate and propagate circuit, wherein said first signal comprises a carry out bit from said carry circuit.

4. The circuit of claim 1 wherein said linear address, said base address, and said limit value each comprise n bits.

5. The circuit of claim 4 wherein full adder circuit comprises n parallel 3-to-2 adders wherein each of said 3-to-2 adders receives its 3 inputs from one bit of said linear address, a corresponding bit of said base address, and a corresponding bit of said logical limit.

6. The circuit of claim 4 wherein said potential limit violation detection circuit includes an inverter for inverting a least significant bit of said plurality of sum bits to produce a least significant bit of an n-bit result; wherein said potential limit violation detection circuit further includes n−1 EXOR gates, wherein each of said n−1 EXOR gates receives one bit of said plurality of sum bits and a corresponding bit of said plurality of carry bits as inputs and further wherein an output of each said n−1 EXOR gates comprises one bit of said n-bit result.

7. A method of checking for address limit violations in a microprocessor based computer comprising:
    providing a linear address, a base address, and a logical limit to a full adder circuit;
    computing a plurality of sum bits and a plurality of carry bits from said linear address, said base address, and said logical limit with said full adder circuit;
    providing said plurality of sum bits and said plurality of carry bits to a definite limit violation detection circuit, wherein said definite limit violation detection circuit produces a definite limit violation signal in response to said plurality of sum bits and said plurality of carry bits; and
    providing said plurality of sum bits and said plurality of carry bits to a potential limit violation detection circuit, wherein said potential limit violation detection circuit produces a potential limit violation signal in response to said plurality of sum bits and said plurality of carry bits;
    wherein said potential limit violation detection circuit complements a least significant bit of said plurality of sum bits to produce a least significant bit of a result.

8. The method of claim 7 wherein said definite limit violation signal is indicative of whether said linear address is greater than the sum of said base address and said logical limit.

9. The method of claim 7 wherein said potential limit violation signal is indicative of whether said linear address is equal to the sum of said base address and said logical limit.

10. The method of claim 7 wherein said full adder circuit includes an initial stage for complementing said linear address and said logical limit.

11. The method of claim 7 wherein said linear address, said base address, and said logical limit each comprise n bits.

12. The method of claim 7 wherein said full adder circuit includes n 3-to-2 adders in parallel, wherein each said adder receives one bit from said linear address, a corresponding bit from said base address, and a corresponding bit from said logical limit as inputs.

13. The method of claim 7 wherein said definite limit violation detection circuit includes a generate and propagate circuit, and carry circuit coupled to said generate and propagate circuit, wherein said definite limit violation signal comprises a carry out bit from said carry circuit.

14. The method of claim 7, wherein said potential limit violation detection circuit EXCLUSIVELY OR's each of said plurality of carry bits with a corresponding bit of said plurality of sum bits to produce a plurality of result bits.

15. The method of claim 14 wherein said plurality of result bits and said least significant bit are combined to produce a result word, and wherein said potential limit violation signal is indicative of whether each bit within said result word is set to logical 1.

16. In a microprocessor based computer system, an address limit violation detection circuit, comprising:
    a full adder circuit adapted to receive a linear address, a base address, and a limit value, and further adapted to produce a plurality of sum bits and carry bits in response thereto;
    a definite limit violation detection circuit adapted to receive said plurality of sum bits and carry bits from said full adder circuit and further adapted to produce a first signal in response thereto wherein said first signal is indicative of whether said linear address is greater than the sum of said base address and said limit; and
    a potential limit violation detection circuit adapted to receive said plurality of sum bits and carry bits from said full adder circuit and further adapted to produce a second signal in response thereto wherein said second signal is indicative of whether said linear address is equal to the sum of said base address and said limit value;
    wherein said linear address, said base address, and said limit value each comprise n bits;

wherein said potential limit violation detection circuit includes an inverter for inverting a least significant bit of said plurality of sum bits to produce a least significant bit of an n-bit result.

17. The circuit of claim 16, wherein said definite limit violation detection circuit includes a generate and propagate circuit, and a carry circuit coupled to said generate and propagate circuit, wherein said first signal comprises a carry out bit from said carry circuit.

18. The circuit of claim 16, wherein full adder circuit comprises n parallel 3-to-2 adders wherein each of said 3-to-2 adders receives its 3 inputs from one bit of said linear address, a corresponding bit of said base address, and a corresponding bit of said logical limit.

19. The circuit of claim 16, wherein said potential limit violation detection circuit further includes n−1 EXOR gates, wherein each of said n−1 EXOR gates receives one bit of said plurality of sum bits and a corresponding bit of said plurality of carry bits as inputs and further wherein an output of each said n−1 EXOR gates comprises one bit of said n-bit result.

20. The circuit of claim 16 wherein said potential limit violation detection circuit further includes a circuit adapted to receive n inputs and further adapted to produce an output indicative of whether each of said n inputs comprises a logical "1".

21. In a microprocessor based computer system, an address limit violation detection circuit, comprising:
 a full adder circuit adapted to receive a linear address, a base address, and a limit value, and further adapted to produce a plurality of sum bits and carry bits in response thereto;
 a definite limit violation detection circuit adapted to receive said plurality of sum bits and carry bits from said full adder circuit and further adapted to produce a first signal in response thereto wherein said first signal is indicative of whether said linear address is greater than the sum of said base address and said limit; and
 a potential limit violation detection circuit adapted to receive said plurality of sum bits and carry bits from said full adder circuit and further adapted to produce a second signal in response thereto wherein said second signal is indicative of whether said linear address is equal to the sum of said base address and said limit value;
 wherein said full adder circuit includes an initial stage for producing a one's complement representation of said base address and said limit value.

22. The circuit of claim 21, wherein said definite limit violation detection circuit includes a generate and propagate circuit, and a carry circuit coupled to said generate and propagate circuit, wherein said first signal comprises a carry out bit from said carry circuit.

23. The circuit of claim 21, wherein said linear address, said base address, and said limit value each comprise n bits.

24. The circuit of claim 23 wherein full adder circuit comprises n parallel 3-to-2 adders wherein each of said 3-to-2 adders receives its 3 inputs from one bit of said linear address, a corresponding bit of said base address, and a corresponding bit of said logical limit.

25. The circuit of claim 23, wherein said potential limit violation detection circuit includes an inverter for inverting a least significant bit of said plurality of sum bits to produce a least significant bit of an n-bit result.

26. The circuit of claim 25, wherein said potential limit violation detection circuit further includes n−1 EXOR gates, wherein each of said n−1 EXOR gates receives one bit of said plurality of sum bits and a corresponding bit of said plurality of carry bits as inputs and further wherein an output of each said n−1 EXOR gates comprises one bit of said n-bit result.

* * * * *